No. 650,479. Patented May 29, 1900.
C. A. U. PÉPIN.
LIFE SAVING RAFT.
(Application filed Nov. 6, 1899.)
(No Model.)
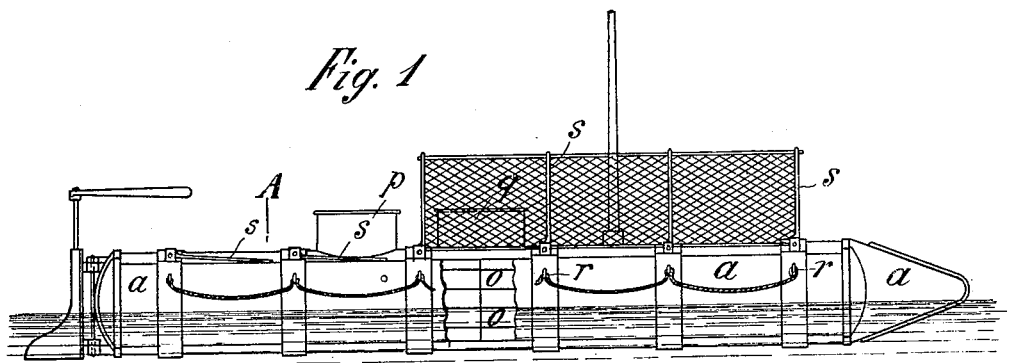
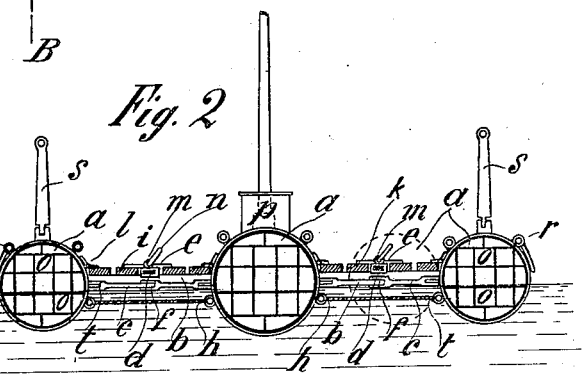
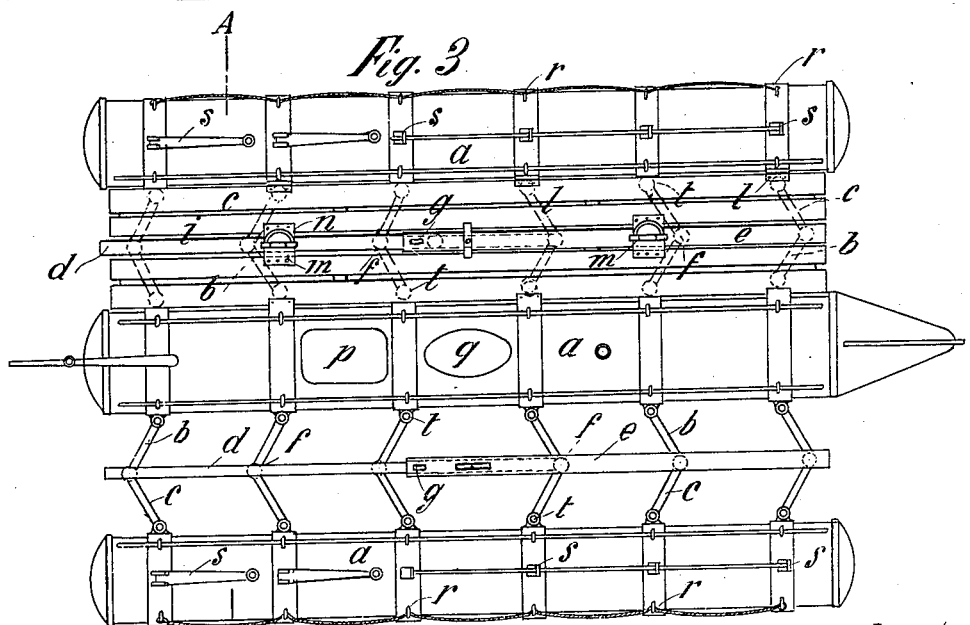
Witnesses:
Inventor:
C. A. U. Pépin
by Dr. H. Burgin, attorney

UNITED STATES PATENT OFFICE.

CHARLES ALEXANDRE ULYSSE PÉPIN, OF CAEN, FRANCE.

LIFE-SAVING RAFT.

SPECIFICATION forming part of Letters Patent No. 650,479, dated May 29, 1900.

Application filed November 6, 1899. Serial No. 736,034. (No model.)

*To all whom it may concern:*

Be it known that I, CHARLES ALEXANDRE ULYSSE PÉPIN, a citizen of the Republic of France, residing at Caen, France, have invented Improvements in Life-Saving Rafts, of which the following is a specification.

The present invention relates to a raft for life-saving purposes, and more especially to a raft or float which when not in use may be folded up into a relatively-narrow compass. The float consists, mainly, of three or more hollow cylindrical bodies, which by means of connecting members or links are connected in such a way that they can readily be opened for use and folded again for hanging the raft or float upon the davits when not in use. Means are provided which secure the various parts in the folded or extended position, respectively.

In order to make my invention more readily understood, I have illustrated it on the accompanying sheet of drawings, in which—

Figure 1 shows a side view of the raft. Fig. 2 represents a sectional elevation on line A B of Fig. 1, and Fig. 3 is a plan view of Fig. 1.

Three or more cylindrical hollow bodies $a$ are connected by means of the members or links $b$ and $c$, the one end of which is fastened to the hollow bodies by means of the hinge-joints $t$ and the other end of which is fastened to a brace-rod $d$ $e$ by means of the hinge-joints $f$. The brace-rod $d$ $e$ is composed of two rods $d$ and $e$, respectively, which slide one upon the other and permit thus of the said brace-rod being extended or shortened.

When the raft is extended for use, the links $b$ and $c$ include an obtuse angle the apex of which is formed by the hinge-joint $f$. The apices of the angles included by links $b$ and $c$, fastened to the rod $d$, face in a direction opposite to that of the apices of the angles included by the links $b$ and $c$, fastened to the rod $e$. By extending or shortening the brace-rod $d$ $e$ the hollow bodies $a$ by these means are caused to approach each other or to move apart. The two rods $d$ and $e$ are secured in the desired position by means of a securing or locking device $g$ of any suitable form.

Ropes $h$, fastened between the hollow bodies, prevent these latter from getting too far apart.

In unfolding the craft a floor is laid out automatically over the framework, made up of the links and the brace-rod. This floor is composed of two wooden boards $i$ and $k$, which are connected by means of the hinges $m$. By means of the hinges $l$ these boards are secured to the hollow bodies. When the cylindrical bodies are in their outermost position, these two boards $i$ and $k$ form a plane floor or deck. When the cylindrical hollow bodies are made to approach each other, these two floor-boards fold up into the position shown by dotted lines in Fig. 2. This folding up of the floor and the nearing of the hollow bodies is effected automatically when the craft is lifted out of the water by means of the hoisting-ropes, which are fastened to a shackle $n$, secured to the pintle of the hinges $m$.

In launching the raft the two floor-boards are laid out flat, and the hollow bodies are moved apart by the weight of the passengers getting on the raft.

In order to prevent the float from sinking by a hole being stove into one or the other of the hollow bodies, these latter are divided, by means of partition-walls, into separate chambers or compartments $o$, as is clearly shown in Figs. 1 and 3.

Upon the middle cylindrical body $a$ watertight boxes $p$ and $q$ for storing food and drink are provided, and ropes attached to eyes $r$ on the outer cylindrical bodies enable persons struggling in the water to hold onto and more easily board the raft. Rods $s$ serve to hold up a railing.

I claim—

In a life-saving raft in combination, the hollow bodies $a$, the links $b$ and $c$ hinged with one end to the said bodies $a$ and with the other end to a brace-rod $d$, $e$ composed of two rods $d$ and $e$ respectively, sliding one upon the other, half of the said links $b$ and $c$ opening and closing in a direction opposite to that of the other half of the links, and means for securing the rod $d$ upon the rod $e$ in the desired position, substantially as shown and described.

In testimony whereof I affix my signature in presence of two witnesses.

CHARLES ALEXANDRE ULYSSE PÉPIN.

Witnesses:
J. PRIMSIS,
W. DELLOYE.